United States Patent
Iguchi et al.

(10) Patent No.: US 12,460,055 B2
(45) Date of Patent: Nov. 4, 2025

(54) LOW-MOLECULAR-WEIGHT POLYTETRAFLUOROETHYLENE PRODUCTION METHOD AND POWDER

(71) Applicant: DAIKIN INDUSTRIES, LTD., Osaka (JP)

(72) Inventors: Chisato Iguchi, Osaka (JP); Eiji Masuda, Osaka (JP); Masayuki Tsuji, Osaka (JP); Akira Shimodo, Osaka (JP); Jirou Hiromoto, Osaka (JP); Shigeki Santou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 420 days.

(21) Appl. No.: 17/860,799

(22) Filed: Jul. 8, 2022

(65) Prior Publication Data

US 2022/0363845 A1    Nov. 17, 2022

Related U.S. Application Data (63) Continuation of application No. PCT/JP2021/000244, filed on Jan. 6, 2021.

(30) Foreign Application Priority Data

Jan. 9, 2020  (JP) ................. 2020-002283
Mar. 10, 2020 (JP) ................. 2020-040675

(51) Int. Cl.
C08J 3/28     (2006.01)
C08F 114/26   (2006.01)

(52) U.S. Cl.
CPC ........... *C08J 3/28* (2013.01); *C08F 114/26* (2013.01); *C08J 2327/18* (2013.01)

(58) Field of Classification Search
None
See application file for complete search history.

(56) References Cited

U.S. PATENT DOCUMENTS

| | | | |
|---|---|---|---|
| 10,538,605 B2 * | 1/2020 | Yoshida | ............ C08J 3/28 |
| 2019/0023818 A1 | 1/2019 | Yoshida et al. | |
| 2019/0023856 A1 | 1/2019 | Yoshida et al. | |
| 2021/0032379 A1 | 2/2021 | Tsuji et al. | |
| 2021/0046209 A1 | 2/2021 | Tsuji et al. | |
| 2021/0347953 A1 | 11/2021 | Oshima et al. | |
| 2022/0127391 A1 | 4/2022 | Higashi et al. | |

FOREIGN PATENT DOCUMENTS

| | | | |
|---|---|---|---|
| JP | 10-147617 A | 6/1998 | |
| JP | 2018-024868 A | 2/2018 | |
| JP | 2018-024869 A | 2/2018 | |
| JP | 2021-014543 A | 2/2021 | |
| WO | WO-2018026017 A1 * | 2/2018 | ............ C08F 8/50 |
| WO | 2019/156037 A1 | 8/2019 | |
| WO | 2019/156039 A1 | 8/2019 | |
| WO | 2020/013336 A1 | 1/2020 | |

OTHER PUBLICATIONS

International Preliminary Report on Patentability (with translation of the Written Opinion) dated Jul. 12, 2022, issued in International Application No. PCT/JP2021/000244.
Extended European Search Report dated Jan. 16, 2024 in counterpart Application No. 21738565.7.
International Search Report for PCT/JP2021/000244 dated Mar. 30, 2021.

* cited by examiner

*Primary Examiner* — Sanza L. McClendon
(74) *Attorney, Agent, or Firm* — Sughrue Mion, PLLC (57) ABSTRACT

A method for producing low-molecular-weight polytetrafluoroethylene containing a reduced amount of C4-C16 perfluorocarboxylic acids and salts thereof, as well as a powder containing low-molecular weight polytetrafluoroethylene, the method including (1) irradiating polytetrafluoroethylene containing a C4-C16 perfluorocarboxylic acid or any salt thereof and having a heat-of-fusion reduction of 40% or lower between first heating and second heating in differential scanning calorimetry with radiation to a dose of 5 to 1000 kGy substantially in the absence of oxygen at a temperature of lower than 100° C. to provide low-molecular-weight polytetrafluoroethylene containing a reduced amount of the perfluorocarboxylic acid and any salt thereof and having a melt viscosity at 380° C. of $1.0 \times 10^2$ to $7.0 \times 10^5$ Pa·s.

4 Claims, 1 Drawing Sheet

LOW-MOLECULAR-WEIGHT POLYTETRAFLUOROETHYLENE PRODUCTION METHOD AND POWDER

CROSS REFERENCE TO RELATED APPLICATIONS

This application is a Bypass Continuation of International Application No. PCT/JP2021/000244 filed Jan. 6, 2021, claiming priority based on Japanese Patent Application No. 2020-002283 filed Jan. 9, 2020 and Japanese Patent Application No. 2020-040675 filed Mar. 10, 2020, the above-identified applications being incorporated herein by reference in their respective entireties.

TECHNICAL FIELD

The disclosure relates to methods for producing low-molecular-weight polytetrafluoroethylene, and powders.

BACKGROUND ART

Low-molecular-weight polytetrafluoroethylene (also referred to as "polytetrafluoroethylene wax" or "polytetrafluoroethylene micropowder") having a molecular weight of several thousands to several hundreds of thousands has excellent chemical stability and a very low surface energy, as well as low fibrillatability. Thus, low-molecular-weight polytetrafluoroethylene is used as an additive for improving the lubricity and the texture of coating surfaces in production of articles such as plastics, inks, cosmetics, coating materials, and greases (for example, see Patent Literature 1).

Examples of known methods for producing low-molecular-weight polytetrafluoroethylene include polymerization, radiolysis, and pyrolysis. Conventional radiolysis is commonly such that radiation is applied to high-molecular-weight polytetrafluoroethylene in the air atmosphere to provide low-molecular-weight polytetrafluoroethylene.

Also examined are methods of reducing perfluorocarboxylic acids and salts thereof that may be generated as by-products of radiolysis (for example, see Patent Literature 2).

CITATION LIST

Patent Literature

Patent Literature 1: JP H10-147617 A
Patent Literature 2: JP 2018-24868 A

SUMMARY

Solution to Problem

The disclosure relates to a method for producing low-molecular-weight polytetrafluoroethylene, the method including:
(1) irradiating polytetrafluoroethylene containing a C4-C16 perfluorocarboxylic acid or any salt thereof and having a heat-of-fusion reduction of 40% or lower between first heating and second heating in differential scanning calorimetry with radiation to a dose of 5 to 1000 kGy substantially in the absence of oxygen at a temperature of lower than 100° C. to provide low-molecular-weight polytetrafluoroethylene containing a reduced amount of the perfluorocarboxylic acid and any salt thereof and having a melt viscosity at 380° C. of $1.0 \times 10^2$ to $7.0 \times 10^5$ Pa·s.

Advantageous Effects

The disclosure can provide a method for producing low-molecular-weight polytetrafluoroethylene containing a reduced amount of C4-C16 perfluorocarboxylic acids and salts thereof.

The disclosure can also provide a powder of novel low-molecular-weight polytetrafluoroethylene containing a small amount of perfluorooctanoic acid and salts thereof.

DESCRIPTION OF EMBODIMENTS

Figure 1:
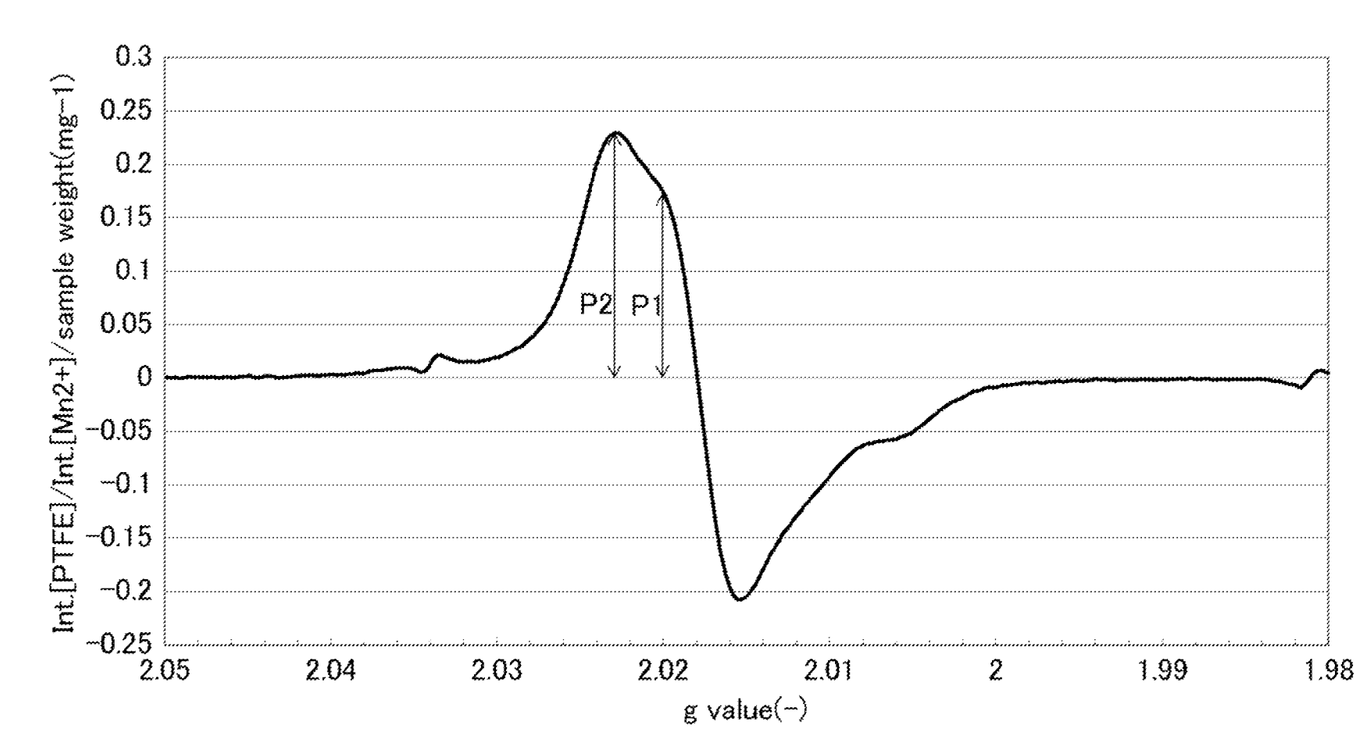
The FIGURE is a diagram showing exemplary P1 and P2 in an electron spin resonance (ESR) spectrum.

The disclosure is described in detail below.

The disclosure relates to a method for producing low-molecular-weight polytetrafluoroethylene (low-molecular-weight PTFE), the method including: (1) irradiating polytetrafluoroethylene (PTFE) containing a C4-C16 perfluorocarboxylic acid or any salt thereof and having a heat-of-fusion reduction of 40% or lower between first heating and second heating in differential scanning calorimetry with radiation to a dose of 5 to 1000 kGy substantially in the absence of oxygen at a temperature of lower than 100° C. to provide low-molecular-weight polytetrafluoroethylene containing a reduced amount of the perfluorocarboxylic acid and any salt thereof and having a melt viscosity at 380° C. of $1.0 \times 10^2$ to $7.0 \times 10^5$ Pa·s.

The production method of the disclosure can provide, starting from PTFE containing C4-C16 perfluorocarboxylic acids or salts thereof, low-molecular-weight PTFE containing a reduced amount of the perfluorocarboxylic acids and salts thereof.

The irradiation with radiation to a specific dose is considered to decompose the perfluorocarboxylic acids and salts thereof contained in the PTFE to be irradiated. Also, the irradiation performed substantially in the absence of oxygen seems to less cause additional formation of the perfluorocarboxylic acids or salts thereof when part of the PTFE is decomposed by irradiation. As a result, low-molecular-weight PTFE containing a reduced amount of the perfluorocarboxylic acids and salts thereof is considered to be obtained.

Further, the production method of the disclosure requires no heating at high temperature, which eliminates the need for introduction of heating equipment. Further, the production method requires no steps such as transferring the resulting low-molecular-weight PTFE from irradiation equipment to heating equipment. Thus, the production method of the disclosure can achieve improved productivity and reduced production cost.

The PTFE to be irradiated in the step (1) has a heat-of-fusion reduction of 40% or lower between first heating and second heating in differential scanning calorimetry. The heat-of-fusion reduction is an index of the molecular weight of the PTFE, and PTFE having a higher heat-of-fusion reduction tends to have a higher molecular weight.

The heat-of-fusion reduction is preferably 35% or lower, more preferably 30% or lower, still more preferably 27% or lower, while may be −30% or higher or −20% or higher.

The heat-of-fusion reduction is determined by measurement using a differential scanning calorimeter (DSC, trade name: DSC 7020, available from Hitachi High-Tech Corp.). Specifically, about 10 mg of PTFE is precisely weighed and placed in a dedicated aluminum pan. The aluminum pan is heated to 200° C. in a nitrogen atmosphere and held for five minutes, followed by heating to 390° C. (first heating) at a rate of 10° C./min to sufficiently melt the crystals. Thereby, the heat of fusion is determined. Subsequently, the temperature is decreased from 390° C. to 200° C. at a rate of 10° C./min, followed by heating from 200° C. to 390° C. at a rate of 10° C./min (second heating). Thereby, the heat of fusion is determined. The heat-of-fusion reduction is determined by the following formula using the measurement values of the heat of fusion at the first heating and the heat of fusion at the second heating.

Heat-of-fusion reduction (%)=(Heat of fusion at first heating−Heat of fusion at second heating)/(Heat of fusion at first heating)×100

PTFE having the heat-of-fusion reduction can be produced, for example, by radiolysis or pyrolysis of high-molecular-weight PTFE. The radiolysis or pyrolysis may be performed in any atmosphere, for example, in the air, in an inert gas, or in a vacuum. In order to achieve low cost, the radiolysis or pyrolysis is preferably performed in the air. In order to reduce formation of C4-C16 perfluorocarboxylic acids and salts thereof, the radiolysis or pyrolysis is preferably performed substantially in the absence of oxygen. Since the production method of the disclosure includes the step (1), the radiolysis or pyrolysis is not necessarily performed substantially in the absence of oxygen. The radiolysis or pyrolysis may be performed in the presence of oxygen (e.g., in the air).

The high-molecular-weight PTFE preferably has a standard specific gravity (SSG) of 2.130 to 2.230. The standard specific gravity (SSG) is a value determined in conformity with ASTM D4895.

The PTFE can also be directly produced by polymerization of tetrafluoroethylene (TFE). In this case, the heat-of-fusion reduction can be adjusted to be within the above range by selecting an initiator or controlling the polymerization temperature or polymerization time.

The PTFE contains C4-C16 perfluorocarboxylic acids or salts thereof.

Such perfluorocarboxylic acids or salts thereof are used in production of PTFE by polymerization in some cases. Further, these perfluorocarboxylic acids or salts are usually formed when the radiolysis of high-molecular-weight PTFE is performed in the air atmosphere. The production method of the disclosure can provide low-molecular-weight PTFE containing a reduced amount of the perfluorocarboxylic acids and salts thereof even when PTFE containing the perfluorocarboxylic acids or salts thereof for any reason are used as a raw material.

The amount (total amount) of the perfluorocarboxylic acids and salts thereof in the PTFE may be 5 ppb by mass or more, more than 10 ppb by mass, more than 15 ppb by mass, more than 20 ppb by mass, 25 ppb by mass or more, more than 50 ppb by mass, more than 100 ppb by mass, more than 500 ppb by mass, more than 1000 ppb by mass, more than 2000 ppb by mass, more than 3000 ppb by mass, or more than 10000 ppb by mass.

The amount of the perfluorocarboxylic acids and salts thereof can be determined by liquid chromatography.

The PTFE may contain perfluorooctanoic acid or salts thereof. The amount of the perfluorooctanoic acid and salts thereof in the PTFE may be, for example, 5 ppb by mass or more, more than 10 ppb by mass, more than 15 ppb by mass, more than 20 ppb by mass, 25 ppb by mass or more, more than 50 ppb by mass, more than 100 ppb by mass, more than 300 ppb by mass, more than 500 ppb by mass, or more than 1500 ppb by mass.

The amount of the perfluorooctanoic acid and salts thereof can be determined by liquid chromatography.

The PTFE may contain C4-C16 perfluorosulfonic acids or salts thereof. The total amount of the perfluorosulfonic acids and salts thereof in the PTFE may be 5 ppb by mass or more, more than 10 ppb by mass, more than 15 ppb by mass, more than 20 ppb by mass, or 25 ppb by mass or more.

The amount of the perfluorosulfonic acids and salts thereof can be determined by liquid chromatography.

The PTFE may be in any form and is preferably in the form of powder.

The dose of radiation in the step (1) is 5 to 1000 kGy. In order to obtain low-molecular-weight PTFE containing a further reduced amount of the perfluorocarboxylic acids and salts thereof, the dose is preferably 10 kGy or higher, more preferably 20 kGy or higher, still more preferably 30 kGy or higher, particularly preferably 50 kGy or higher. In order to obtain low-molecular-weight PTFE having a moderately high molecular weight, the dose is preferably 500 kGy or lower, more preferably 300 kGy or lower, still more preferably less than 250 kGy, particularly preferably 200 kGy or lower.

The dose means the absorbed dose.

Examples of the radiation include any ionizing radiation, such as electron beams, gamma rays, X-rays, neutron beams, and high energy ions. Electron beams or gamma rays are preferred.

The irradiation temperature of the radiation is lower than 100° C. The irradiation temperature is preferably lower than 70° C., more preferably lower than 50° C., while preferably 5° C. or higher.

From an economic viewpoint, the irradiation is preferably performed at normal temperature. The normal temperature may refer to a temperature range from 5° C. to 60° C., preferably from 10° C. to 50° C., more preferably from 10° C. to lower than 50° C., still more preferably from 15° C. to 45° C., including the heat generated by the irradiation.

The production method of the disclosure enables sufficient reduction in the amount of the perfluorocarboxylic acids and salts thereof through such treatment at relatively low temperatures.

The irradiation in the step (1) is performed substantially in the absence of oxygen. The phrase "substantially in the absence of oxygen" herein means that the oxygen concentration in the atmosphere where the step is performed is 0.5 vol % or less. In order to obtain low-molecular-weight PTFE containing a further reduced amount of the perfluorocarboxylic acids and salts thereof, the oxygen concentration is preferably 0.25 vol % or less, more preferably 0.1 vol % or less, still more preferably 0.01 vol % or less, particularly preferably 0.001 vol % or less. The lower limit thereof may be, but is not limited to, a value lower than the detection limit.

The oxygen concentration can be determined by a method of analyzing a gaseous phase inside a space where the step is performed by gas chromatography, a method of using an oxygen concentration meter, or a method of observing the color tone of an oxygen detection agent placed in the space.

The irradiation in the step (1) is preferably performed in an airtight container. The airtight container refers to a container that can be sealed to enable adjustment of the oxygen concentration inside the container. The airtight container may be coupled with pipes for intake and exhaust of inert gas and for exhaust of the gas inside the airtight container, and may be coupled with components such as other pipes, caps, valves, and flanges which are not opened during the irradiation with radiation. The airtight container may have any shape, such as a cylindrical shape, a prismatic shape, or a spherical shape, or may be a capacity-variable bag. The container may be formed from any material, such as metal, glass, or a polymer. The material and structure of the airtight container should be radiolucent and non-radiolytic. The airtight container needs not to be a pressure-resistant container.

The production method of the disclosure may include feeding the PTFE into an airtight container substantially in the absence of oxygen before the step (1). The phrase "feeding the PTFE into an airtight container substantially in the absence of oxygen" means that the oxygen concentration of the atmosphere inside the airtight container after the feeding is within the range described above.

An example of a method of feeding the PTFE into an airtight container substantially in the absence of oxygen is a method in which the PTFE and at least one selected from the group consisting of inert gas and an oxygen absorbent are fed into the airtight container.

An example of a method of feeding the materials mentioned above into the airtight container is a method in which the PTFE is placed in the airtight container, and then the airtight container is filled with the inert gas or evacuated. In the case of using an oxygen adsorbent, examples of the method of feeding include a method in which the PTFE and the oxygen adsorbent are placed in the airtight container in the air and then the airtight container is sealed, a method in which the PTFE and the oxygen adsorbent are placed in the airtight container and then the airtight container is filled with the inert gas, and a method in which the PTFE and the oxygen adsorbent are placed in the airtight container and then the airtight container is evacuated.

The inert gas needs to be a gas inert to a reaction of decomposing the perfluorocarboxylic acids and salts thereof (and the PTFE) by irradiation with radiation. Examples of the inert gas include gases such as nitrogen, helium, and argon. Preferred among these is nitrogen.

The inert gas has an oxygen content of preferably 0.5 vol % or less, more preferably 0.25 vol % or less, still more preferably 0.1 vol % or less, further more preferably 0.01 vol % or less, particularly preferably 0.001 vol % or less. The lower limit thereof may be, but is not limited to, a value lower than the detection limit. An inert gas having an oxygen content within the above range can lead to low-molecular-weight PTFE containing a further reduced amount of the perfluorocarboxylic acids and salts thereof.

The oxygen content can be checked by gas chromatography analysis, as well as by the use of an oxygen concentration meter or oxygen detection paper.

The oxygen adsorbent may be any adsorbent having a function of adsorbing oxygen. Examples thereof include known oxygen adsorbents, including inorganic oxygen adsorbents such as iron-based, zinc-based, or hydrosulfite-based adsorbents, and organic oxygen adsorbents such as ascorbic acid-based, polyhydric alcohol-based, or activated carbon-based adsorbents. The oxygen adsorbent may be of either a water-dependent type which uses water for a reaction with oxygen or a self-reactive type which does not use water. Preferred is a self-reactive type. The oxygen adsorbent is preferably an iron-based self-reactive oxygen adsorbent, quicklime, or the like, and is more preferably an iron-based self-reactive oxygen adsorbent.

The amount of the oxygen adsorbent fed is preferably an amount that can maintain the oxygen concentration inside the airtight container within the range described above.

The irradiation in the step (1) is preferably performed substantially in the absence of halogenated polymers containing a halogen atom other than a fluorine atom.

The halogenated polymers encompass polymers containing a halogen atom other than a fluorine atom together with a fluorine atom.

Examples of the halogenated polymers include polymers containing a chlorine atom such as polyvinyl chloride (PVC), polyvinylidene chloride (PVdC), and polychlorotrifluoroethylene (PCTFE).

The phrase "substantially in the absence of halogenated polymers" means that the amount of the halogenated polymers is less than 0.001% by mass relative to the PTFE. The amount is preferably 0.0001% by mass or less. The lower limit thereof may be, but is not limited to, a value lower than the detection limit.

The irradiation in the step (1) is also preferably performed substantially in the absence of hydrocarbons, chlorinated hydrocarbons, alcohols, and carboxylic acids.

Examples of the hydrocarbons include C1-C20 saturated hydrocarbons.

Examples of the chlorinated hydrocarbons include chlorinated products of C1-C18 saturated hydrocarbons.

Examples of the alcohols include C1-C12 monohydric saturated alcohols.

Examples of the carboxylic acids include C1-C13 saturated monocarboxylic acids.

The phrase "substantially in the absence of" these compounds means that the amount (total amount) of the compounds is less than 0.001% by mass relative to the PTFE. The amount is preferably 0.0001% by mass or less. The lower limit thereof may be, but is not limited to, a value lower than the detection limit.

In the step (1), low-molecular-weight PTFE containing a reduced amount of C4-C16 perfluorocarboxylic acids and salts thereof is obtained. In other words, the amount of the perfluorocarboxylic acids and salts thereof in the low-molecular-weight PTFE is smaller than that in the PTFE before the irradiation with radiation in the step (1).

In the step (1), the percentage of reduction in the amount of the C4-C16 perfluorocarboxylic acids and salts thereof (PFC) (percentage of PFC reduction) is preferably 10% by mass or higher, more preferably 20% by mass or higher, still more preferably 30% by mass or higher, further more preferably 40% by mass or higher, particularly preferably 50% by mass or higher. The percentage of PFC reduction is preferably as high as possible, and the upper limit thereof is not limited and may be 100% by mass.

The percentage of PFC reduction is determined by the following equation using the measured PFC amounts in the PTFE before irradiation with radiation in the step (1) and in the low-molecular-weight PTFE obtained in the step (1), which are determined by liquid chromatography.

Percentage of PFC reduction (% by mass)=(Amount of PFC in PTFE before irradiation−Amount of PFC in low-molecular-weight PTFE obtained)/(Amount of PFC in PTFE before irradiation)×100

In the step (1), low-molecular-weight PTFE containing a reduced amount of perfluorooctanoic acid and salts thereof can also be obtained. In other words, the amount of the perfluorooctanoic acid and salts thereof in the low-molecular-weight PTFE can be reduced to be smaller than that in the PTFE before the irradiation with radiation in the step (1).

In the step (1), the percentage of reduction in the amount of the perfluorooctanoic acid and salts thereof (PFOA) (percentage of PFOA reduction) is preferably 10% by mass or higher, more preferably 20% by mass or higher, still more preferably 30% by mass or higher, further more preferably 40% by mass or higher, particularly preferably 50% by mass or higher. The percentage of PFOA reduction is preferably as high as possible, and the upper limit thereof is not limited and may be 100% by mass.

The percentage of PFOA reduction is determined by the following equation using the measured PFOA amounts in the PTFE before irradiation with radiation in the step (1) and in the low-molecular-weight PTFE obtained in the step (1), which are determined by liquid chromatography.

Percentage of PFOA reduction (% by mass)=
(Amount of PFOA in PTFE before irradiation−
Amount of PFOA in low-molecular-weight
PTFE obtained)/(Amount of PFOA in PTFE
before irradiation)×100

The amount (total amount) of the C4-C16 perfluorocarboxylic acids and salts thereof in the low-molecular-weight PTFE obtained in the step (1) may be 10000 ppb by mass or less, 3000 ppb by mass or less, 2000 ppb by mass or less, 1000 ppb by mass or less, 500 ppb by mass or less, 100 ppb by mass or less, 50 ppb by mass or less, less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The amount of the perfluorocarboxylic acids and salts thereof can be determined by liquid chromatography.

The amount of the perfluorooctanoic acid and salts thereof in the low-molecular-weight PTFE may be 1500 ppb by mass or less, 500 ppb by mass or less, 300 ppb by mass or less, 100 ppb by mass or less, 50 ppb by mass or less, less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The amount of the perfluorooctanoic acid and salts thereof can be determined by liquid chromatography.

The amount of the C4-C16 perfluorosulfonic acids and salts thereof in the low-molecular-weight PTFE may be less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The amount of the perfluorosulfonic acids and salts thereof can be determined by liquid chromatography.

The amount of the perfluorosulfonic acids and salts thereof in the low-molecular-weight PTFE may be smaller than that in the PTFE to be irradiated.

The low-molecular-weight PTFE has a melt viscosity at 380° C. of $1.0 \times 10^2$ to $7.0 \times 10^5$ Pa·s. The melt viscosity is preferably $1.5 \times 10^3$ Pa·s or higher, more preferably $7.0 \times 10^3$ Pa·s or higher, while preferably $3.0 \times 10^3$ Pa·s or lower, more preferably $1.0 \times 10^5$ Pa·s or lower, still more preferably $9.0 \times 10^4$ Pa·s or lower.

The melt viscosity is a value determined by heating a 2-g sample at 380° C. for five minutes in advance and then keeping this sample at this temperature under a load of 0.7 MPa using a flow tester (available from Shimadzu Corp.) and a 2Φ-8 L die in conformity with ASTM D1238.

The low-molecular-weight PTFE has a melting point of 320° C. to 340° C., more preferably 324° C. to 336° C.

The melting point is defined using a differential scanning calorimeter (DSC) as follows. Specifically, temperature calibration is performed in advance with indium and lead as standard samples. Then, about 3 mg of low-molecular-weight PTFE is put into an aluminum pan (crimped container), and the temperature is increased at a rate of 10° C./min within the temperature range of 250° C. to 380° C. under air flow at 200 ml/min. The minimum point of the heat of fusion within this region is defined as the melting point.

The low-molecular-weight PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the disclosure, the composition of the polymer is not changed. Thus, the low-molecular-weight PTFE has the composition of the PTFE as it is.

The modified PTFE preferably contains the modifying monomer unit in an amount of 0.001 to 1% by mass, more preferably 0.01% by mass or more, while more preferably 0.5% by mass or less, still more preferably 0.1% by mass or less, of all monomer units. The term "modifying monomer unit" herein means a moiety that is part of the molecular structure of the modified PTFE and is derived from a modifying monomer. The term "all monomer units" herein means all moieties derived from monomers in the molecular structure of the modified PTFE. The amount of the modifying monomer unit can be determined by a known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, unsaturated perfluoro compounds represented by the following formula (1):

$$CF_2=CF-ORf \qquad (1)$$

(wherein Rf is a perfluoro organic group). The "perfluoro organic group" herein means an organic group in which all hydrogen atoms bonded to any carbon atom are replaced by fluorine atoms. The perfluoro organic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

[Chem. 1]

(wherein m is 0 or an integer of 1 to 4), and those represented by the formula (1) in which Rf is a group represented by the following formula:

[Chem. 2]

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE preferably includes at least one selected from the group consisting of HFP, CTFE, VDF, PPVE, PFBE, and ethylene, more preferably at least one selected from the group consisting of HFP and CTFE.

The low-molecular-weight PTFE may be in any form, and is preferably in the form of powder. Also, both the PTFE and the low-molecular-weight PTFE are preferably in the form of powder.

The production method of the disclosure may further include exposing the low-molecular-weight PTFE obtained in the step (1) to the air.

The time from completion of the irradiation with radiation in the step (1) to the exposing the low-molecular-weight PTFE to the air may be, for example, less than 1 day, less than 10 hours, less than 1 hour, less than 10 minutes, or less than 5 minutes.

In the production method of the disclosure, the PTFE and the low-molecular-weight PTFE are preferably not kept at a temperature of 100° C. or higher, 70° C. or higher, or 50° C. or higher.

The PTFE and the low-molecular-weight PTFE are preferably not kept at the above temperature for 30 minutes or longer, 10 minutes or longer, or 10 seconds or longer.

The production method of the disclosure may further include pulverizing the low-molecular-weight PTFE obtained in the step (1). The pulverizing may be performed by a conventionally known method, but is not limited thereto.

The following further describes the low-molecular-weight PTFE obtainable by the production method of the disclosure.

The low-molecular-weight PTFE, when in the form of powder, preferably has an average particle size of 0.5 to 200 μm, more preferably 100 μm or smaller, still more preferably 50 μm or smaller, further preferably 25 μm or smaller, particularly preferably 10 μm or smaller. The powder having such a comparatively small average particle size can form a film having better surface smoothness when used as an additive for a coating material, for example.

The average particle size is equivalent to the particle size corresponding to 50% of the cumulative volume in the particle size distribution determined using a laser diffraction particle size distribution analyzer (HELOS & RODOS) available from JEOL Ltd. at a dispersive pressure of 3.0 bar without cascade impaction.

The low-molecular-weight PTFE, when in the form of powder, preferably has a specific surface area of 0.5 to 20 $m^2/g$.

For the low-molecular-weight PTFE powder, both of the following two types are demanded, i.e., a small specific surface area type having a specific surface area of not smaller than 0.5 $m^2/g$ but smaller than 7.0 $m^2/g$ and a large specific surface area type having a specific surface area of not smaller than 7.0 $m^2/g$ and not larger than 20 $m^2/g$.

The low-molecular-weight PTFE powder of a small specific surface area type has an advantage of easy dispersion in a matrix material such as a coating material. In contrast, such powder disperses in a matrix material with a large dispersed particle size, i.e., with poor fine dispersibility.

The low-molecular-weight PTFE powder of a small specific surface area type preferably has a specific surface area of 1.0 $m^2/g$ or larger, while preferably 5.0 $m^2/g$ or smaller, more preferably 3.0 $m^2/g$ or smaller. Suitable examples of the matrix material include plastics and inks, as well as coating materials.

The low-molecular-weight PTFE powder of a large specific surface area type, when dispersed in a matrix material such as a coating material, has advantages of high surface-modifying effects, such as a small dispersed particle size in a matrix material and improved texture of the coating surface, and a large amount of oil absorption. In contrast, such powder may not be easily dispersed in a matrix material, for example, may take a long time for dispersion, and may cause an increased viscosity of a coating material, for example.

The low-molecular-weight PTFE powder of a large specific surface area type preferably has a specific surface area of 8.0 $m^2/g$ or larger, while preferably 25 $m^2/g$ or smaller, more preferably 20 $m^2/g$ or smaller. Suitable examples of the matrix material include oils, greases, and coating materials, as well as plastics.

The specific surface area is determined by the BET method using a surface analyzer (trade name: BELSORP-mini II, available from MicrotracBEL Corp.), a gas mixture of 30% nitrogen and 70% helium as carrier gas, and liquid nitrogen for cooling.

The molecular chain of the low-molecular-weight PTFE may be terminated with a carboxy group. The number of carboxyl groups may be, but is not limited to, for example, 0 to 500 per $10^6$ carbon atoms of the main chain.

The number of carboxy groups can be determined by the following method. The detection limit of this measurement method is 0.5.

(Measurement Method)

The following measurement is performed in conformity with the method of analyzing end groups described in JP H04-20507 A.

A low-molecular-weight PTFE powder is pre-formed with a hand press, so that a film having a thickness of about 0.1 mm is prepared. The resulting film is subjected to infrared absorption spectrum analysis. PTFE with completely fluorinated ends produced by a contact with fluorine gas is also subjected to infrared absorption spectrum analysis. Based on the difference spectrum therebetween, the number of end carboxy groups is calculated by the following formula.

$$\text{Number of end carboxy groups (per } 10^6 \text{ carbon atoms)} = (I \times K)/t$$

I: absorbance
K: correction coefficient
t: film thickness (mm)

The absorption frequency and correction coefficient of the carboxy group are respectively set to 3560 $cm^{-1}$ and 440.

The molecular chain of the low-molecular-weight PTFE may be terminated with an unstable end group derived from the chemical structure of the polymerization initiator or chain-transfer agent used in the polymerization reaction for the PTFE or the high-molecular-weight PTFE. Examples of the unstable end group include, but are not limited to, —CH$_2$OH, —COOH, and —COOCH$_3$.

The low-molecular-weight PTFE may be one having undergone stabilization of the unstable end group. The unstable end group may be stabilized by any method, such as a method of exposing the unstable end group to fluorine-containing gas to convert them into a trifluoromethyl group (—CF$_3$), for example.

The low-molecular-weight PTFE may contain amidated ends. The end amidation may be performed by any method, such as a method of bringing a fluorocarbonyl group (—COF) obtained by exposure to fluorine-containing gas into contact with ammonia gas as disclosed in JP H04-20507 A, for example.

The low-molecular-weight PTFE with stabilization or end amidation of the unstable end group as described above can be well compatible with opposite materials and have improved dispersibility when used as an additive for opposite materials such as coating materials, greases, cosmetics, plating solutions, toners, and plastics.

The production method of the disclosure may further include a step (M1) of heating the high-molecular-weight polytetrafluoroethylene up to a temperature that is not lower than the primary melting point thereof to provide a molded article before the step (1).

The primary melting point is preferably 300° C. or higher, more preferably 310° C. or higher, still more preferably 320° C. or higher.

The primary melting point refers to the maximum peak temperature on an endothermic curve present on the crystal melting curve when unsintered high-molecular-weight PTFE is analyzed with a differential scanning calorimeter. The endothermic curve is obtainable by heating at a temperature-increasing rate of 10° C./min using a differential scanning calorimeter.

The molded article in the step (M1) has a specific gravity of preferably 1.0 g/cm$^3$ or higher, more preferably 1.5 g/cm$^3$ or higher, while preferably 2.5 g/cm$^3$ or lower. The molded article having a specific gravity within the above range can have smaller pores or irregularities on the surface, finally providing low-molecular-weight PTFE having a small specific surface area.

The specific gravity can be determined by water displacement.

After the step (M1), a step (M2) is preferably performed in which the molded article obtained in the step (M1) is subjected to radiolysis or pyrolysis to obtain PTFE having a heat-of-fusion reduction of 40% or lower between first heating and second heating in differential scanning calorimetry.

In this case, the PTFE obtained in the step (M2) may be used as the PTFE in the step (1).

The radiolysis or pyrolysis may be performed in any atmosphere, for example, in the air, in an inert gas, or in a vacuum. In order to achieve low cost, the radiolysis or pyrolysis is preferably performed in the air. In order to reduce formation of C4-C16 perfluorocarboxylic acids and salts thereof, the radiolysis or pyrolysis is preferably performed substantially in the absence of oxygen. Since the production method of the disclosure includes the step (1), the radiolysis or pyrolysis is not necessarily performed substantially in the absence of oxygen. The radiolysis or pyrolysis may be performed in the presence of oxygen (e.g., in the air).

In the case of feeding the PTFE into an airtight container substantially in the absence of oxygen as described above, the steps (M1) and (M2) are preferably performed before the feeding.

The production method of the disclosure may further include pulverizing the molded article and providing powder after the step (M1) and before the step (M2). The molded article may be first coarsely and then finely pulverized.

The disclosure also relates to a powder containing low-molecular-weight polytetrafluoroethylene, an amount of perfluorooctanoic acid and salts thereof in the powder being 1500 ppb by mass or less, the low-molecular-weight polytetrafluoroethylene having a melt viscosity at 380° C. of 1×10$^2$ to 7×10$^5$ Pa·s and satisfying a difference (P1−P2) of −0.07 or higher in a primary differential spectrum obtainable by electron spin resonance (ESR) measurement, wherein P1 represents an intensity of a signal having a g value of 2.020 and P2 represents an intensity of a signal having a g value of 2.023.

The low-molecular-weight PTFE in the powder of the disclosure shows the specific signals mentioned above in a primary differential spectrum (hereinafter, also referred to as an ESR spectrum) obtainable by electron spin resonance (ESR) measurement.

Low-molecular-weight PTFE obtainable by a conventional technique such as irradiation with radiation in the presence of oxygen does not show the specific signals mentioned above. The structure and percentage of radicals contained in the low-molecular-weight PTFE obtainable by conventional techniques are presumably different from those of the low-molecular-weight PTFE in the powder of the disclosure.

The measurement conditions of the ESR and definitions of related terms are described below.

The measurement conditions are as follows.
Device: JES-FR30EX available from JEOL Ltd.
Measurement temperature: 23±3° C.
Microwave frequency: 9.42 GHz
Microwave outputs: 0.4 mW
Center field: 347.548 mT
Sweep width: ±25 mT
Sweep time: 60 s
Time constant: 0.03 s
Field modulation width: 0.32 mT
Number of scans: 1
Modulation frequency: 100 kHz
Marker: Mn$^{2+}$ In the ESR spectrum, the vertical axis expresses a corrected signal intensity and the horizontal axis expresses a g value.

The corrected signal intensity is defined by the following expression:

$$\text{corrected signal intensity (mg}^{-1}\text{)} = \text{Int. [PTFE]/Int. [Mn}^{2+}\text{]/sample mass (mg)}$$

wherein Int. [PTFE] represents the signal intensity of the sample before correction and Int. [Mn$^{2+}$] represents the signal intensity of the marker.

When the term "intensity" is simply used herein in relation to the signal in the ESR spectrum of PTFE, it refers to the corrected signal intensity, unless otherwise specified.

The g value of ESR signals is defined by the following expression:

$$g = h\nu/\beta H$$

wherein h represents the Planck constant, ν represents the frequency of the measurement electromagnetic wave, B represents the Bohr magneton, and H represents the field intensity at which the signal is obtained.

The g value used is a value corrected based on the known g values 2.034 and 1.981 which respectively correspond to the third and fourth peaks, among six peaks of $Mn^{2+}$ used as a marker, from the lower magnetic field side.

In the case where the base line of the ESR spectrum is shifted, the base line correction is performed such that the signal intensities at g values of around 2.05 and 1.98 are set to 0.

In the ESR spectrum, a positive signal refers to a signal appearing in a positive region (upper side of the base line) of the spectrum and a negative signal refers to a signal appearing in a negative region (lower side of the base line) of the spectrum.

The low-molecular-weight PTFE in the powder of the disclosure satisfies a difference (P1–P2) of –0.07 or higher in the ESR spectrum, wherein P1 represents the intensity of the signal having a g value of 2.020 and P2 represents the intensity of the signal having a g value of 2.023.

The signal having a g value of 2.020 and the signal having a g value of 2.023 each may be a positive signal. P1 and P2 may each be an absolute value of the corresponding intensity of the signal.

The signal (peak) having a g value of 2.020 is considered to be a signal based on a radical 1 represented by the following formula:

[Chem. 3]

(wherein the wave line represents a polymer chain of PTFE; the same applies hereinafter), and the signal (peak) having a g value of 2.023 is considered to be a signal based on a radical 2 represented by the following formula:

[Chem. 4]

The low-molecular-weight PTFE having a heat-of-fusion reduction of 40% or lower contains the radical 1 and the radical 2.

The subsequent irradiation substantially in the absence of oxygen (the step (1)) decomposes some of the radicals 2 into the radicals 1. Accordingly, the percentage of the radicals 1 tends to be large.

In contrast, the irradiation in the air generates the radicals 1 and the radicals 2. Accordingly, the percentage of the radicals 1 does not increase.

As described in the EXAMPLES below, the difference (P1–P2) before irradiation (Comparative Example 2), which is lower than –0.07, is increased to –0.07 or higher after irradiation (e.g., Example 1) by the production method of the disclosure. This means that the irradiation in the step (1) reduces the radicals 2 and increases the radicals 1 by.

That the difference (P1–P2) is –0.07 or higher means that the difference between the amount of the radicals 1 and the amount of the radicals 2 in the low-molecular-weight PTFE is not smaller than a certain amount. In other words, this means that the amount of the radicals 1 is larger than that of the radicals 2.

The low-molecular-weight PTFE satisfying a difference (P1–P2) of –0.07 or higher can be produced, for example, by the above-described production method of the disclosure. Thus, the powder of the disclosure can be produced at a lower cost than conventionally known low-molecular-weight PTFE powders. With a difference (P1–P2), which is lower than –0.07, the production cost may increase.

The difference (P1–P2) is preferably higher than 0.00, more preferably 0.01 or higher, still more preferably 0.02 or higher. The difference (P1–P2) may be 0.10 or lower, preferably 0.05 or lower.

The step (1) can control the difference (P1–P2) to be within the above range.

The FIGURE shows an example of P1 and P2 in an ESR spectrum.

The low-molecular-weight PTFE in the powder of the disclosure has a melt viscosity at 380° C. of $1\times10^2$ to $7\times10^5$ Pa·s. The melt viscosity is preferably $1.5\times10^3$ Pa·s or higher, more preferably $7.0\times10^3$ Pa·s or higher, while preferably $3.0\times10^3$ Pa·s or lower, more preferably $1.0\times10^3$ Pa·s or lower, still more preferably $9.0\times10^4$ Pa·s or lower.

The composition, melting point, and ends of the molecular chain (the number of carboxy groups and unstable end groups and stabilization or amidation thereof) of the low-molecular-weight PTFE in the powder of the disclosure may be the same as those having been described for the low-molecular-weight PTFE obtainable by the production method of the disclosure.

The powder of the disclosure may substantially consist only of the low-molecular-weight PTFE. The amount of the low-molecular-weight PTFE relative to the powder may be 95.0% by mass or more, preferably 99.0% by mass or more, more preferably 99.5% by mass or more.

In the powder of the disclosure, the amount of perfluorooctanoic acid and any salts thereof is 1500 ppb by mass or less. The amount of the perfluorooctanoic acid and salts thereof relative to the powder may be 500 ppb by mass or less, 300 ppb by mass or less, 100 ppb by mass or less, 50 ppb by mass or less, less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The powder of the disclosure may contain C4-C16 perfluorocarboxylic acids and salts thereof in an amount (total amount) of 10000 ppb by mass or less, 3000 ppb by mass or less, 2000 ppb by mass or less, 1000 ppb by mass or less, 500 ppb by mass or less, 100 ppb by mass or less, 50 ppb by mass or less, less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The powder of the disclosure may contain C4-C16 perfluorosulfonic acids and salts thereof in an amount of less than 25 ppb by mass, 20 ppb by mass or less, 15 ppb by mass or less, 10 ppb by mass or less, or less than 5 ppb by mass. The lower limit thereof may be, but is not limited to, a value lower than the detection limit.

The powder of the disclosure preferably has a specific surface area of 0.5 to 20 m$^2$/g.

The powder of the disclosure has an average particle size of preferably 0.5 to 200 µm, more preferably 100 µm or smaller, still more preferably 50 µm or smaller, further preferably 25 µm or smaller, particularly preferably 10 µm or smaller. The powder having such a comparatively small average particle size can form a film having better surface smoothness when used as an additive for a coating material, for example.

The powder of the disclosure is obtainable by producing low-molecular-weight PTFE in the form of powder by the production method of the disclosure described above. The powder of the disclosure has excellent physical properties which are not inferior to those of conventionally known low-molecular-weight PTFE powders, and can be used in the same manner and for the same applications as conventionally known low-molecular-weight PTFE powders.

The low-molecular-weight PTFE obtainable by the production method of the disclosure and the powder of the disclosure each can suitably be used as a molding material, an ink, a cosmetic, a coating material, a grease, a component for office automation devices, an additive for modifying toners, an organic photoconductor material for copiers, and an additive for plating solutions, for example. Examples of the molding material include engineering plastics such as polyoxybenzoyl polyester, polyimide, polyamide, polyamide-imide, polyacetal, polycarbonate, and polyphenylene sulfide. The low-molecular-weight PTFE and the powder are each particularly suitable as a thickening agent for greases.

The low-molecular-weight PTFE and the powder each can suitably be used as an additive for molding materials for improving the non-stickiness/sliding property of rollers of copiers, for improving the texture of molded articles of engineering plastics, such as surface sheets of furniture, dashboards of automobiles, and covers of home appliances, and for improving the lubricity and abrasion resistance of machine elements generating mechanical friction, such as light-load bearings, gears, cams, buttons of push-button telephones, movie projectors, camera components, and sliding materials, and as a processing aid for engineering plastics, for example.

The low-molecular-weight PTFE and the powder each can be used as an additive for coating materials for the purpose of improving the lubricity of varnish and paint. The low-molecular-weight PTFE and the powder can be each used as an additive for cosmetics for the purpose of improving the lubricity of cosmetics such as foundation.

The low-molecular-weight PTFE and the powder each can also be suitably used for improving the oil- or water-repellency of wax and for improving the lubricity of greases and toners.

The low-molecular-weight PTFE and the powder each can be used as an electrode binder of secondary batteries and fuel cells, a hardness adjuster for electrode binders, and a water-repellent for electrode surfaces.

The low-molecular-weight PTFE or the powder may be combined with a lubricant to provide grease. The grease is characterized by containing the low-molecular-weight PTFE or the powder and a lubricant. Thus, the low-molecular-weight PTFE or the powder is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low-molecular-weight PTFE or the powder in an amount of 0.1 to 60% by mass, more preferably 0.5% by mass or more, still more preferably 5% by mass or more, while more preferably 50% by mass or less. A grease containing too large an amount of the low-molecular-weight PTFE or the powder may be too hard to exert sufficient lubricity. A grease containing too small an amount of the low-molecular-weight PTFE or the powder may fail to exert the sealability.

The grease may also contain any of additives such as solid lubricants, extreme pressure agents, antioxidants, oilness agents, anticorrosives, viscosity index improvers, and detergent dispersants.

The disclosure relates to a method for producing low-molecular-weight polytetrafluoroethylene, the method including:

(1) irradiating polytetrafluoroethylene containing a C4-C16 perfluorocarboxylic acid or any salt thereof and having a heat-of-fusion reduction of 40% or lower between first heating and second heating in differential scanning calorimetry with radiation to a dose of 5 to 1000 kGy substantially in the absence of oxygen at a temperature of lower than 100° C. to provide low-molecular-weight polytetrafluoroethylene containing a reduced amount of the perfluorocarboxylic acid and any salt thereof and having a melt viscosity at 380° C. of $1.0 \times 10^2$ to $7.0 \times 10^5$ Pa·s.

Preferably, the polytetrafluoroethylene and the low-molecular-weight polytetrafluoroethylene are each in the form of powder.

The disclosure also relates to a powder containing low-molecular-weight polytetrafluoroethylene, an amount of perfluorooctanoic acid and any salt thereof in the powder being 1500 ppb by mass or less, the low-molecular-weight polytetrafluoroethylene having a melt viscosity at 380° C. of $1\times10^2$ to $7\times10^5$ Pa·s and satisfying a difference (P1−P2) of −0.07 or higher in a primary differential spectrum obtainable by electron spin resonance measurement, wherein P1 represents an intensity of a signal having a g value of 2.020 and P2 represents an intensity of a signal having a g value of 2.023.

Preferably, the powder has a specific surface area of 0.5 to 20 m$^2$/g.

EXAMPLES

The disclosure is more specifically described below with reference to examples. Still, the disclosure is not intended to be limited to the examples.

The parameters in the examples were determined by the following methods.

Heat-of-Fusion Reduction

The heat-of-fusion reduction was determined by measurement using a differential scanning calorimeter (DSC, trade name: DSC 7020, available from Hitachi High-Tech Corp.). Specifically, about 10 mg of PTFE was precisely weighed and placed in a dedicated aluminum pan. The aluminum pan was heated to 200° C. in a nitrogen atmosphere and held for five minutes, followed by heating to 390° C. (first heating) at a rate of 10° C./min to sufficiently melt the crystals. Thereby, the heat of fusion was determined. Subsequently, the temperature was decreased from 390° C. to 200° C. at a rate of 10° C./min, followed by heating from 200° C. to 390° C. at a rate of 10° C./min (second heating). Thereby, the heat of fusion was determined. The heat-of-fusion reduction was determined by the following formula using the measurement values of the heat of fusion at the first heating and the heat of fusion at the second heating.

Heat-of-fusion reduction (%)=(Heat of fusion at first heating−Heat of fusion at second heating)/(Heat of fusion at first heating)×100

Melt Viscosity (MV)

The melt viscosity was determined by heating a 2-g sample at 380° C. for five minutes in advance and then keeping this sample at this temperature under a load of 0.7 MPa using a flow tester (available from Shimadzu Corp.) and a 2ϕ-8 L die in conformity with ASTM D1238.

Measurement by electron spin resonance (ESR)
Device: JES-FR30EX available from JEOL Ltd.
Measurement temperature: 23±3° C.
Microwave frequency: 9.42 GHz
Microwave outputs: 0.4 mW
Center field: 347.548 mT
Sweep width: ±25 mT
Sweep time: 60 s
Time constant: 0.03 s
Field modulation width: 0.32 mT
Number of scans: 1
Modulation frequency: 100 kHz
Marker: $Mn^{2+}$ Amount of Perfluorooctanoic Acid and Salts Thereof (PFOA)

The amount of perfluorooctanoic acid and salts thereof was determined using a liquid chromatography-mass spectrometer (LC-MS ACQUITY UPLC/TQD, Waters). First, 1 g of a measurement powder was mixed with 5 mL of acetonitrile and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were delivered at a predetermined concentration gradient (A/B=40/60 for 2 min and 80/20 for 1 min) as mobile phases. A separation column (ACQUITY UPLC BEH C18 1.7 μm) was used at a column temperature of 40° C. and an injection volume of 5 μL. Electrospray ionization (ESI) in a negative mode was used for ionization, the cone voltage was set to 25 V, and the ratio of the molecular weight of precursor ions to the molecular weight of product ions was measured to be 413/369. The amount of perfluorooctanoic acid and salts thereof was calculated by the external standard method. The detection limit of this measurement is 5 ppb.

Amount of C4-C16 Perfluorocarboxylic Acids and Salts Thereof (PFC)

C4-C16 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 213/169 for perfluorobutanoic acid (C4), 263/219 for perfluoropentanoic acid (C5), 313/269 for perfluorohexanoic acid (C6), 363/319 for perfluoroheptanoic acid (C7), 413/369 for perfluorooctanoic acid (C8), 463/419 for perfluorononanoic acid (C9), 513/469 for perfluorodecanoic acid (C10), 563/519 for perfluoroundecanoic acid (C11), 613/569 for perfluorododecanoic acid (C12), 663/619 for perfluorotridecanoic acid (C13), 713/669 for perfluorotetradecanoic acid (C14), 763/719 for perfluoropentadecanoic acid (C15), and 813/769 for perfluorohexadecanoic acid (C16).

The total amount of C4-C16 perfluorocarboxylic acids and salts thereof was calculated from the amount (X) of the perfluorooctanoic acid obtained in the above measurement by the following formula. The detection limit of this measurement is 5 ppb.

$$(A_{C4}+A_{C5}+A_{C6}+A_{C7}+A_{C8}+A_{C9}+A_{C10}+A_{C11}+A_{C12}+A_{C13}+A_{C14}+A_{C15}+A_{C16})/A_{C8}\times X$$

$A_{C4}$: peak area of perfluorobutanoic acid
$A_{C5}$: peak area of perfluoropentanoic acid
$A_{C6}$: peak area of perfluorohexanoic acid
$A_{C7}$: peak area of perfluoroheptanoic acid
$A_{C8}$: peak area of perfluorooctanoic acid
$A_{C9}$: peak area of perfluorononanoic acid $A_{C10}$: peak area of perfluorodecanoic acid
$A_{C11}$: peak area of perfluoroundecanoic acid
$A_{C12}$: peak area of perfluorododecanoic acid
$A_{C13}$: peak area of perfluorotridecanoic acid
$A_{C14}$: peak area of perfluorotetradecanoic acid
$A_{C15}$: peak area of perfluoropentadecanoic acid
$A_{C16}$: peak area of perfluorohexadecanoic acid
X: amount of perfluorooctanoic acid calculated from the MRM measurement result by the external standard method Percentage of Reduction in the Amount of C4-C16 Perfluorocarboxylic Acids and Salts Thereof (Percentage of PFC Reduction)

The percentage of PFC reduction is determined by the following equation using the measured amounts of PFC in the PTFE before irradiation with radiation and in the low-molecular-weight PTFE, which are determined by the above-described technique.

Percentage of PFC reduction (% by mass)=(Amount of PFC in PTFE before irradiation−Amount of PFC in low-molecular-weight PTFE obtained)/(Amount of PFC in PTFE before irradiation)×100

Oxygen Concentration in Airtight Container

The oxygen concentration was determined by analyzing a gaseous phase inside the airtight container by gas chromatography. Moreover, the color tone of oxygen detection paper enclosed in the airtight container was observed to change from blue to pink, which demonstrated that the oxygen concentration was less than 0.1 vol % (oxygen free).

Example 1

A 50-g portion of PTFE micropowder (PTFE-MP) (1) (heat-of-fusion reduction: 10.7%, amount of PFOA: 155 ppb by mass, amount of PFC: 1008 ppb by mass) was weighed and put into a barrier nylon bag.

An iron-based self-reactive oxygen adsorbent (AGELESS ZP-100 available from Mitsubishi Gas Chemical Company) was further put in the barrier nylon bag as an oxygen adsorbent. The resulting bag was sealed by heat sealing. The absence of oxygen was confirmed using oxygen detection paper placed in the bag in advance, and then the PTFE micropowder in the bag was irradiated with 10 kGy of cobalt-60γ rays at an ambient temperature of 20° C. to 45° C. Thus, a low-molecular-weight PTFE powder was obtained. The ambient temperature during the irradiation is a temperature including heat generated during the irradiation (the same shall apply to the following examples and comparative examples).

The physical properties of the resulting low-molecular-weight PTFE powder were determined. Before determination of the physical properties, the bag was opened immediately after completion of the irradiation and the resulting powder was held in the air for about 30 minutes. Table 1 shows the results.

Example 2

A low-molecular-weight PTFE powder was obtained as in Example 1, except that the irradiation was performed using 100 kGy of cobalt-60γ rays.

The physical properties of the resulting low-molecular-weight PTFE powder were determined as in Example 1. Table 1 shows the results.

Example 3

A low-molecular-weight PTFE powder was obtained as in Example 1, except that the irradiation was performed using 400 kGy of cobalt-60γ rays.

The physical properties of the resulting low-molecular-weight PTFE powder were determined as in Example 1. Table 1 shows the results.

Examples 4 to 9

Low-molecular-weight PTFE powders were obtained as in Example 2, except that PTFE micropowders (2) to (7) each having a heat-of-fusion reduction shown in Table 1 and containing PFOA and PFC in amounts shown in Table 1 were used instead of the PTFE micropowder (1). The physical properties of the resulting low-molecular-weight PTFE powder were determined as in Example 1. Table 1 shows the results.

Comparative Example 1

A 50-g portion of the PTFE micropowder (1) was weighed and put into a barrier nylon bag. The resulting bag was sealed by heat sealing. The PTFE micropowder in the bag was irradiated with 100 kGy of cobalt-60γ rays at an ambient temperature of 20° C. to 45° C. Thus, a low-molecular-weight PTFE powder was obtained.

The physical properties of the resulting low-molecular-weight PTFE powder were determined as in Example 1. Table 1 shows the results.

Comparative Example 2

The physical properties were determined as in Example 1, except that the PTFE micropowder (1) was not irradiated with radiation. Table 1 shows the results.

TABLE 1

| | | | | Before irradiation | | | After irradiation | | | | |
| | | | | Heat-of- | | | | | | | |
| | Raw material | Atmosphere | Irradiation dose (kGy) | fusion reduction (%) | PFOA (ppb by mass) | PFC (ppb by mass) | MV (Pa·s) | PFOA (ppb by mass) | PFC (ppb by mass) | ESR P1 − P2 | Percentage of PFC reduction (% by mass) |
|---|---|---|---|---|---|---|---|---|---|---|---|
| Example 1 | PTFE-MP (1) | Oxygen-free | 10 | 10.7 | 155 | 1008 | 48000 | 116 | 754 | −0.054 | 25 |
| Example 2 | PTFE-MP (1) | Oxygen-free | 100 | 10.7 | 155 | 1008 | 49000 | 24 | 156 | 0.030 | 85 |
| Example 3 | PTFE-MP (1) | Oxygen-free | 400 | 10.7 | 155 | 1008 | 6200 | <5 | 26 | 0.081 | 97 |

TABLE 1-continued

| | | | Before irradiation | | | After irradiation | | | | |
| | | | Heat-of-fusion reduction (%) | PFOA (ppb by mass) | PFC (ppb by mass) | | PFOA (ppb by mass) | PFC (ppb by mass) | | |
| | Raw material | Atmosphere | Irradiation dose (kGy) | | | | MV (Pa·s) | | | ESR P1 − P2 | Percentage of PFC reduction (% by mass) |
|---|---|---|---|---|---|---|---|---|---|---|---|
| Example 4 | PTFE-MP (2) | Oxygen-free | 100 | 8.9 | 168 | 1100 | 48000 | 52 | 340 | 0.030 | 69 |
| Example 5 | PTFE-MP (3) | Oxygen-free | 100 | 8.7 | 400 | 2600 | 25000 | 220 | 1433 | 0.030 | 45 |
| Example 6 | PTFE-MP (4) | Oxygen-free | 100 | −2.5 | 78 | 505 | 191000 | 26 | 169 | 0.027 | 67 |
| Example 7 | PTFE-MP (5) | Oxygen-free | 100 | 7.5 | 310 | 2015 | 213000 | 65 | 425 | 0.033 | 79 |
| Example 8 | PTFE-MP (6) | Oxygen-free | 100 | −12.6 | 620 | 4033 | 56000 | 52 | 339 | 0.027 | 92 |
| Example 9 | PTFE-MP (7) | Oxygen-free | 100 | −25 | 1925 | 12513 | 4200 | 1040 | 6760 | 0.025 | 46 |
| Comparative Example 1 | PTFE-MP (1) | Air | 100 | 10.7 | 155 | 1008 | 7200 | 659 | 3497 | −0.236 | −247 |
| Comparative Example 2 | PTFE-MP (1) | Air | 0 | 10.7 | 155 | 1008 | 57000 | 155 | 1008 | −0.105 | 0 |

Comparative Example 3

A 50-g portion of the PTFE micropowder (1) was weighed and put into an aluminum cup and heat-treated at 100° C. for three hours using a hot air circulation type electric furnace (high temperature chamber STPH-202M available from Espec Corp.). The physical properties of the resulting low-molecular-weight PTFE powder were determined as in Example 1. Table 2 shows the results.

Comparative Example 4

A low-molecular-weight PTFE powder was obtained as in Comparative Example 3, except that the heat treatment was performed at 100° C. for 0.5 hours. The physical properties of the resulting low-molecular-weight PTFE powder were determined as in Example 1. Table 2 shows the results.

TABLE 2

| | | Before heating | | | | | After heating | | | |
| | | Heating conditions | | Heat-of-fusion reduction (%) | PFOA (ppb by mass) | PFC (ppb by mass) | | PFOA (ppb by mass) | PFC (ppb by mass) | | |
| | Raw material | Temperature (° C.) | Time (h) | | | | MV (Pa·s) | | | ESR P1 − P2 | Percentage of PFC reduction (% by mass) |
|---|---|---|---|---|---|---|---|---|---|---|---|
| Comparative Example 3 | PTFE-MP (1) | 100 | 3 | 10.7 | 155 | 1008 | 45000 | <5 | <5 | −0.079 | 100 |
| Comparative Example 4 | PTFE-MP (1) | 100 | 0.5 | 10.7 | 155 | 1008 | 56000 | <5 | <5 | −0.092 | 100 |

The methods of Comparative Examples 3 and 4 require heating equipment, which results in significant production costs. In contrast, the methods of Examples 1 to 9 require no introduction of heating equipment. These methods also require no steps such as transferring the resulting low-molecular-weight PTFE from irradiation equipment to heating equipment. Thus, the methods of Examples 1 to 9 can achieve improved productivity and reduced production costs.

What is claimed is:

1. A method for producing low-molecular-weight polytetrafluoroethylene, the method comprising:
   (1) irradiating polytetrafluoroethylene containing a C4-C16 perfluorocarboxylic acid or any salt thereof and having a heat-of-fusion reduction of 40% or lower between first heating and second heating in differential scanning calorimetry with radiation to a dose of 5 to 1000 kGy substantially in the absence of oxygen at a temperature of lower than 100° C. to provide low-molecular-weight polytetrafluoroethylene containing a reduced amount of the perfluorocarboxylic acid and any salt thereof and having a melt viscosity at 380° C. of $1.0 \times 10^2$ to $7.0 \times 10^5$ Pa·s.

2. The production method according to claim 1, wherein the polytetrafluoroethylene and the low-molecular-weight polytetrafluoroethylene are each in the form of powder.

3. A powder comprising low-molecular-weight polytetrafluoroethylene,
   an amount of perfluorooctanoic acid and any salt thereof in the powder being 1500 ppb by mass or less,
   the low-molecular-weight polytetrafluoroethylene having a melt viscosity at 380° C. of $1 \times 10^2$ to $7 \times 10^5$ Pa·s and satisfying a difference (P1−P2) of −0.07 or higher in a primary differential spectrum obtainable by electron spin resonance measurement, wherein P1 represents an intensity of a signal having a g value of 2.020 and P2 represents an intensity of a signal having a g value of 2.023.

4. The powder according to claim 3,
   wherein the powder has a specific surface area of 0.5 to 20 m²/g.

* * * * *